(12) United States Patent
Hansen et al.

(10) Patent No.: US 8,290,855 B2
(45) Date of Patent: Oct. 16, 2012

(54) CONTROLLING AN ORDER SLICER FOR TRADING A FINANCIAL INSTRUMENT

(75) Inventors: Peter Hansen, Stamford, CT (US); Lars Kragh, Stamford, CT (US); Nicolay Landmark, Stamford, CT (US)

(73) Assignee: NYFIX, Inc., New York, NY (US)

( * ) Notice: Subject to any disclaimer, the term of this patent is extended or adjusted under 35 U.S.C. 154(b) by 0 days.

(21) Appl. No.: 13/369,025

(22) Filed: Feb. 8, 2012

(65) Prior Publication Data
US 2012/0179629 A1 Jul. 12, 2012

Related U.S. Application Data

(62) Division of application No. 11/009,194, filed on Dec. 10, 2004, now Pat. No. 8,140,423.

(51) Int. Cl.
*G06Q 40/00* (2012.01)
(52) U.S. Cl. .............................. 705/37; 705/35; 705/36 R
(58) Field of Classification Search .................... 705/35, 705/36 R, 37, 38
See application file for complete search history.

(56) References Cited

U.S. PATENT DOCUMENTS

| | | | | |
|---|---|---|---|---|
| 5,297,031 A * | 3/1994 | Gutterman et al. ............. | 705/37 |
| 5,347,452 A * | 9/1994 | Bay, Jr. ............................ | 705/37 |
| 6,289,321 B1 | 9/2001 | Suganuma | |
| 6,408,282 B1 * | 6/2002 | Buist ............................ | 705/36 R |
| 6,983,260 B2 * | 1/2006 | Hummelgren .................. | 705/37 |
| 6,993,504 B1 * | 1/2006 | Friesen et al. ................... | 705/37 |
| 7,110,974 B1 * | 9/2006 | Rust ................................ | 705/37 |
| 7,243,083 B2 * | 7/2007 | Burns et al. ..................... | 705/37 |
| 7,299,208 B1 * | 11/2007 | Bailon et al. .................... | 705/37 |
| 7,305,361 B2 * | 12/2007 | Otero et al. ................. | 705/36 R |
| 7,330,834 B1 * | 2/2008 | LaPierre ........................ | 705/37 |
| 7,406,443 B1 * | 7/2008 | Fink et al. ....................... | 705/37 |
| 7,418,416 B2 * | 8/2008 | Guidi et al. ................. | 705/36 R |
| 7,565,313 B2 * | 7/2009 | Waelbroeck et al. ........... | 705/37 |
| 7,574,388 B1 * | 8/2009 | Peebler ........................... | 705/35 |
| 7,613,647 B1 * | 11/2009 | Cushing et al. ................. | 705/37 |
| 7,734,528 B1 * | 6/2010 | O'Connor et al. .............. | 705/37 |
| 7,974,909 B1 * | 7/2011 | Tresenriter ...................... | 705/37 |
| 2001/0049649 A1 * | 12/2001 | Baecker et al. ................. | 705/37 |
| 2001/0056391 A1 | 12/2001 | Schultz | |
| 2003/0009399 A1 * | 1/2003 | Boerner ......................... | 705/35 |
| 2003/0033235 A1 | 2/2003 | Hummelgren | |
| 2003/0061149 A1 * | 3/2003 | Ajitsaria et al. ............... | 705/37 |
| 2003/0069826 A1 | 4/2003 | Guidi et al. | |
| 2003/0177126 A1 * | 9/2003 | Weingard et al. .............. | 707/10 |

(Continued)

OTHER PUBLICATIONS

Improving Process Performance through Market Network ReDesign: A Study of the Impact of Electronic Markets in the Financial Securities Sector; Roland Toppen, Martin Smits, Pieter Ribbers; 1999; 10-pages.*

(Continued)

*Primary Examiner* — Gregory Johnson
(74) *Attorney, Agent, or Firm* — Kelly Drye & Warren LLP

(57) ABSTRACT

In one aspect, the present invention provides an order slicer that receives an order that to trade a financial instrument. The order associates a trading strategy with said order. The trading strategy is replaceable. In another aspect, an interface accepts a trading strategy of an order to trade a financial instrument. A transmitter transmits the trading strategy to an order slicer.

3 Claims, 6 Drawing Sheets

U.S. PATENT DOCUMENTS

| | | | | |
|---|---|---|---|---|
| 2003/0182224 A1* | 9/2003 | Horrigan et al. | | 705/37 |
| 2003/0208427 A1* | 11/2003 | Peters et al. | | 705/36 |
| 2003/0233306 A1* | 12/2003 | Madhavan et al. | | 705/37 |
| 2003/0236737 A1* | 12/2003 | Kemp et al. | | 705/37 |
| 2004/0034591 A1* | 2/2004 | Waelbroeck et al. | | 705/37 |
| 2004/0049443 A1 | 3/2004 | Marcus | | |
| 2004/0059666 A1* | 3/2004 | Waelbroeck et al. | | 705/37 |
| 2004/0111358 A1* | 6/2004 | Lange et al. | | 705/37 |
| 2004/0133500 A1 | 7/2004 | Thompson et al. | | |
| 2004/0133526 A1* | 7/2004 | Shmueli et al. | | 705/80 |
| 2004/0236636 A1* | 11/2004 | Lutnick et al. | | 705/26 |
| 2004/0236662 A1* | 11/2004 | Korhammer et al. | | 705/37 |
| 2004/0236669 A1* | 11/2004 | Horst et al. | | 705/37 |
| 2004/0243502 A1* | 12/2004 | Slowik et al. | | 705/37 |
| 2004/0254870 A1* | 12/2004 | Chitaley et al. | | 705/36 |
| 2004/0254874 A1* | 12/2004 | Bok et al. | | 705/37 |
| 2005/0102219 A1* | 5/2005 | Taylor et al. | | 705/37 |
| 2005/0125326 A1* | 6/2005 | Nangalia et al. | | 705/37 |
| 2005/0149426 A1* | 7/2005 | Jokisch et al. | | 705/37 |
| 2005/0222936 A1* | 10/2005 | Panariti et al. | | 705/37 |
| 2005/0234790 A1* | 10/2005 | Newport | | 705/35 |
| 2005/0273419 A1* | 12/2005 | Ogg et al. | | 705/37 |
| 2005/0273424 A1* | 12/2005 | Silverman et al. | | 705/39 |
| 2005/0283421 A1* | 12/2005 | Hatheway et al. | | 705/37 |
| 2006/0036532 A1* | 2/2006 | Silverman et al. | | 705/37 |
| 2006/0059078 A1* | 3/2006 | Courbois et al. | | 705/37 |
| 2006/0069633 A1* | 3/2006 | Breslow et al. | | 705/35 |
| 2006/0085319 A1* | 4/2006 | Nangalia et al. | | 705/37 |
| 2006/0129473 A1* | 6/2006 | Hansen et al. | | 705/37 |
| 2006/0136318 A1* | 6/2006 | Rafieyan et al. | | 705/37 |
| 2006/0143099 A1* | 6/2006 | Partlow et al. | | 705/35 |
| 2007/0083456 A1* | 4/2007 | Akers | | 705/37 |

OTHER PUBLICATIONS

Optimal slice of a VWAP trade; Hizuru Konishi; Journal of Financial Markets 5 (2002) 197-221; 25-pages.*
Into the Algorithms; Traders; Aug. 1, 2003; 4-pages.*
International Searching Authorit, , "International Search Report and Written Opinion", Int. Search. Auth., Nov. 21, 2006.
Konishi, Hizuru , "Optimal Slice of a VWAP Trade", Journal of Financial Markets 5, 2002, 197-221.
Thomson Media, "Into the Algorithms", Traders, Aug. 1, 2003, 1-4.
Toppen, Roland et al., "Improving Process Performance through Market Network ReDesign: A Study of the Impact of Electronic Markets in the Financial Securities Sector", 1999, 1-10.

* cited by examiner

CONTROLLING AN ORDER SLICER FOR TRADING A FINANCIAL INSTRUMENT

CROSS REFERENCE TO RELATED APPLICATIONS

This application is a divisional application of, and takes priority from, U.S. patent application Ser. No. 11/009,194, filed Dec. 10, 2004 and now U.S. Pat. No. 8,140,423, issued Mar. 20, 2012, from which priority is asserted, and the contents of which are herein incorporated by reference in their entirety.

BACKGROUND OF THE INVENTION

1. Field of the Invention

The present invention relates to market trading. The present invention relates more particularly to controlling an order slicer for varying or replacing a trading strategy in response to changing market conditions, customer requirements, or other factors.

2. Description of the Related Art

Markets have existed for centuries, allowing traders to buy and sell financial instruments, such as securities and commodities. Examples of securities include stocks, bonds, futures and options. Examples of commodities include currencies, metals, and grain. Today, examples of securities markets include "The New York Stock Exchange" (NYSE), "The National Association of Equity Dealers Automated Quotation" (NASDAQ) System, and the "American Stock Exchange" (AMEX). These modem financial instrument markets facilitate the exchange of over two billion shares of stock every business day.

Professional traders typically have different timing objectives associated with different orders. For example, some orders may need to be executed quickly because the trader believes that the price may change unfavorably in the near future. Other orders may have to be executed slowly in order to achieve the best possible price. An example of this would he a trader wishing to execute a large order, perhaps 100,000 units, in a market. Normally, the appearance of such a Large order in the market could adversely affect the current market price of the security. For instance, the appearance of a large "buy" order could adversely drive up the price of a financial instrument, such as stock, commodity or currency. Similarly, the appearance of a large "sell" order could adversely depress the price of the financial instrument. The trader may have as an objective to avoid this effect, or he may decide that it is more important to trade the stock quickly and accept the price impact.

Thus, a trading objective can be generally defined as an aim, goal, or end of market trading activity. These objectives could be followed as a means for maximizing the profit of an order for trader, such as maximizing capital gains.

Once the trading objective for the order is determined, it becomes possible to select an appropriate trading strategy. A trading strategy can be generally defined as a plan or scheme for achieving the trading objective. Examples of strategic trading choices are (a) deciding to break a large order into smaller sub-orders, (b) selecting one or more appropriate market executing venues from a number of possibilities with differing capabilities, and (c) selecting the best timing for sending sub-orders into the market.

The use of sub-orders has led to the development of various computer algorithms for deconstructing orders into smaller sub-orders and sending these sub-orders into the market. A system that implements such an algorithm is known as an "order slicer." Various conventional order slicers are in use for generating sub-orders and sending them to the market. Typically, the trader sends an order to the order slicer from his order management system via a communications link. The order slicer receives the order, and starts executing the order according to a fixed strategy (for example, to split the order up into smaller sub-orders and try to participate in a certain percentage of the total traded volume in the market for that financial instrument).

The use of a conventional order slicer brings a new set of problems for the trader. In particular, if the trading objective for art order changes, the conventional order slicer is limited in how its strategy can be varied to suit the new trading objective or objectives. For example, the trader may judge that an order currently being sliced will achieve a better price if traded more heavily later in the day. As a result of the new objective, the trader has the need to modify the strategy employed by the order slicer. Conventional order slicers only support interacting with the order slicer via the trader's order management system. To change the order slicer's strategy will typically require an order modification (cancel/replace) to be issued by the trader, which would include a new set of parameters added to the order to control the order slicer.

Furthermore, this new set of parameters may adjust some of the details of the trading strategy, but the overall trading strategy remains constant. If a trader wishes to replace one trading strategy with another trading strategy (for example, switching from a strategy of participating in a certain percentage of the day's trading volume to a strategy where the order slicer increases the trading rate towards the end of the trading day), he or she will typically cancel the order from his order management system and send it to a different order slicer with a different strategy, closer to what the trader envisages he or she needs.

This use of "cancel/replace" from within an order management system to control parameters of a fixed strategy order slicer, or the use of a full cancel and subsequent sending of an order to a different destination in order to switch to a different strategy, can be a somewhat disruptive and cumbersome event in market trading.

Therefore, there is a need for a technique for controlling art order slicer in which the order slicer can accept strategy changes in real time, so that a trader can vary the strategy of the order slicer in response to market conditions and customer requirements.

SUMMARY OF THE INVENTION

In one aspect, the present invention provides an order slicer that receives an order. The order is to trade a financial instrument. The order slicer associates a trading strategy with the order, and the trading strategy is replaceable. In another aspect, an interface accepts a trading strategy of an order to trade a financial instrument. A transmitter transmits the trading strategy to an order slicer. In another aspect, the interface is not used to generate the order.

DESCRIPTION OF THE INVENTION

Before proceeding with a description of the present invention, it is well to define certain terms as used herein.

The term "module" is used herein to demarcate a functional operation that may be embodied either as a stand-alone component or as one of a plurality of components in an integrated assembly.

The term "order slicer" is used herein to refer to a device or system that can break down an order for a financial instrument into smaller individual discrete sub-orders. The order slicer can be embodied in hardware, software, firmware, or a combination thereof.

The term "order management system" (OMS) is used herein to refer to a module that can issue "buy" or "sell" commands for financial instruments. The OMS can also issue other associated information, such as the name and quantity of the financial instrument. The OMS can be embodied in hardware, software, firmware, or a combination thereof.

The term "real time" is used herein to refer to responding to events as they occur.

"Variable" can be generally defined as changing the behavior of a first function by changing a parameter within the first function.

"Replaceable" can generally be defined as a first function capable of being completely replaced by, or exchanged for, a second function. The second function does not necessarily employ the same algorithm as the first function. Furthermore, the second function is not necessarily controlled by the same parameters or constants as the first function.

"Quantity" generally refers to the units of sale of a financial instrument for a given order.

"Volume" generally refers to the total sales of a financial instrument in a market for a given time period.

Figure 1:
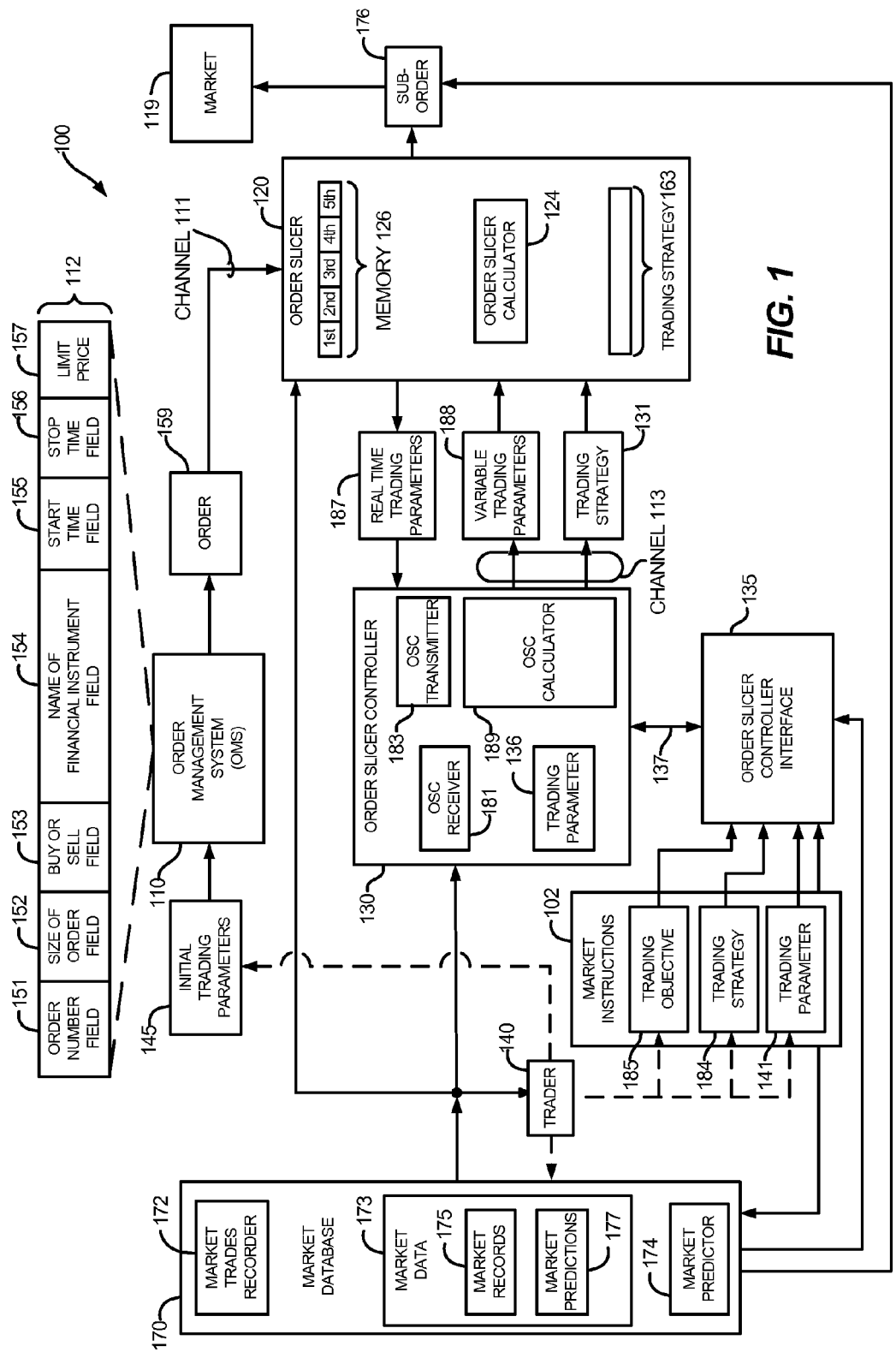
FIG. 1 illustrates a system for updating an order slicer.

Referring to FIG. 1, there is illustrated a system generally represented by reference numeral 100 for placing orders to buy or to sell a financial instrument. System 100 includes an OMS 110, an order slicer 120, an order slicer controller 130, an order slicer controller interface 135, and a market database 170. Order slicer controller 130 and OMS 110 can be integrated into one module or order slicer controller 130 and OMS 110 can be physically separate or distributed in a plurality of modules. Alternatively, order slicer 120 and order slicer controller 130 can be integrated into a single module.

A trader 140 provides initial trading parameters 145 that relate to an order to by or sell a financial instrument. Trader 140 can be a decision-making entity, such as a human, a processing module including software, or a legal entity. Trader 140 also provides market instructions 102 including a trading objective 185, a trading strategy 184 and a trading parameter 141, to order slicer controller interface 135 and market database 170.

Trading objective 185 is an aim, goal, or desired end result of market trading activity. Some examples of trading objective 185 determined or imposed trader 140 are (a) to minimize market impact of an order, (b) to attempt to get the best possible price, and (c) to attempt to execute the order as quickly as possible irrespective of other considerations. These trading objectives could be implemented as a technique for maximizing the profit of an order for trader 140, or trying to reap certain tax benefits. In other words, given the dynamics of the market, following any of (a), (b), or (c) trading objectives could have the most favorable results for trader 140.

For instance, assume trader 140 believes that the best approach to maximize profit trading is to "(a)", minimize the market impact of an order. This could be because trader 140 believes that it would be best not to indicate to other buyers or sellers actions in which trader 140 is engaging. However, if trader 140 believes that the best approach to maximize profit trading is to "(b)" attempt to get the best possible price, trader 140 may not be as worried about other buyers or sellers discerning the traders intentions regarding a given financial instrument. However, if trader 140 believes that the best approach to maximize profit trading is to "(c)" to attempt to execute the order as quickly as possible irrespective of other considerations, trader 140 may believe that the market for a financial instrument is going to quickly collapse (or rise), and the most advantageous position for trader 140 is to try to sell (or buy), and not worrying about other traders discerning his behavior.

As an example of trading objective 185 type "(c)" is that trading objective 185 be a requirement that an order finish during the time allotted to the order ("time in force"), or that at least a quantity of the order finish during time in force, irrespective of market conditions.

Trading objective 185 is replaceable. In other words, option "(c)", above could have replaced option "(a)".

A trading strategy can be generally defined as a plan or scheme for achieving trading objective 185. Examples of strategic trading choices are "(a)" deciding to break a large order into smaller sub-orders, "(b)" selecting one or more appropriate market executing venues from a number of possibilities with differing capabilities, and "(c)" selecting the best timing for sending sub-orders into the market.

As an example of trading strategy 184 of type "(c)", trading strategy 184 is a target quantity distribution of the order to be executed during a time period. Target quantity can be generally defined as the quantity of a financial instrument a trader wishes to trade in a time period. Target quantity distribution can be generally defined as target quantities for two or more time segment. Target quantity distribution is sent to order slicer 120. For instance, a target quantity distribution could be set for 1000 shares for 12:00 p.m. to 1:00 p.m., and 3000 shares for 1:00 p.m. to 2:00 p.m.

Trading strategy 184 can be represented by an equation, such as a polynomial. For instance, if trading strategy 184, is to "a" of selecting the best timing for sending sub-orders into the market, the equation could have the desired sub-order quantity and time to sell a given sub-order represented as follows:

$$At^2 + Bt + C = \text{volume of sub-order for time "}t\text{"}, \quad \text{(Equation. 1)}$$

Where the variables A, B and C are derived through statistical analysis of market data or input as initial trading parameters 145, and "t" represents the incremental time for a given sub-order to be traded.

Trading strategy 184 can be varied. For instance, new statistical data may indicate that the value of A should be varied. For example, it should be increased by the value of "5". Therefore, a varied polynomial for trading strategy 184 would read:

$$(A+5)t^2 + Bt + C = \text{volume of sub-order at time "}t\text{"}. \quad \text{(Equation 2)}$$

Trading strategy 184 is replaceable. In other words, one equation for trading strategy 184 can be replaced with a completely different equation. For instance, Equation 1 could be replaced with (for example):

$$A \sin 2t - (B-1)2 \cos^3 2t + D = \text{volume of sub-order at time "}t\text{."} \quad \text{(Equation 3)}$$

Trading strategy 184 can be a function or functions, such as a polynomial or Fourier series or sequence. Trading strategy 184 can be varied or replaced during the pendancy of the order, that is, before a first sub-order has executed, or alternatively the I 59 order is open.

Trading strategy 184 can be represented by a sequence of programmed steps, such as a script in a programming language. For instance, if trading strategy 184 is "(a)" select the best timing for sending sub-orders into the market, the script could describe the desired sub-order quantity and time to sell a given sub-order as follows: 1: wait until 3:05 p.m.; 2: send sub-order quantity A; 3: wait until 3:15 pm; 4: send sub-order quantity B; 5: wait until 3:30 p.m.; 6. if price >$35.00 then send sub-order quantity C. The times for implementing programmed steps 1 to 6 and quantities A to C may be derived through statistical analysis of market data and input as an equation or script corresponding to trading strategy 184 or input as initial trading parameter 145.

When trader 140 wishes to generate trading strategy 184, one type of trading strategy 184 to implement, for example, option "c" is referred to an "aggressiveness level." An aggressiveness level for trading a financial instrument can be generally defined as the proportion of traded quantity a sub-order or sub-orders represent when compared to the overall traded volume in the market for the financial instrument during a given time period. If trader 140 wishes to input, vary or replace the aggressiveness level, Examples will be given below, For instance, in option "c," trading strategy 184 sets limits as to how far the actual trading quantity associated with a sub-order can vary from an aggressiveness level. For instance, a maximum variation of plus or minus 5% from an aggressiveness level of 20% could be implemented as part of trading strategy 184. In another alternative, trading strategy 184 could be set at a command to sell the entirety of the order.

For instance, trader 140 could determine that the aggressiveness level should be more aggressive at the beginning and end of the day, but less aggressive towards the middle. Therefore, sub-orders would represent a lower percentage of overall volume of shares traded towards the middle of the day, and a higher percentage towards the beginning and end of the day. Trader 140 can vary a start time parameter or a stop time parameter as trading parameter 141.

Initial trading parameters 145 contain an order number parameter, a size of order parameter, a buy or sell parameter, a name of financial instrument parameter, a start time parameter, a stop time parameter, and a limit price parameter. The order number parameter indexes the order, the size of order parameter indicates the size of the order, the start time and the stop time indicate the time interval over which the order is to be sold, and the limit price is the price for which trading will stop for the order.

OMS 110 receives initial trading parameters 145 and stores them into an OMS memory 112. OMS memory 112 has an order number field 151, a size of order field 152, a buy or sell field 153, a name of financial instrument field 154, a start time field 155, a stop time field 156, and a limit price 157. Based on initial trading parameters 145 stored in fields 151 to 157, OMS 110 prepares an order 159.

Order slicer 120 preferably has an order slicer calculator 124, a memory 126, and a trading strategy 163. Order slicer 120 receives order 159 from OMS 110, i.e., a first source, over a channel III. Order slicer 120, i.e. a second source, receives trading strategy 131, from a second source, order slicer controller 130, over a channel 113. Trading strategy 131 becomes trading strategy 163. Alternatively, order slicer 120 can receive a trading strategy 131 that includes a combination of output from a second source and a third source.

Each of channel 111 and channel 113 can either be a logical channel or a physical channel. An example of a physical channel is an electric wire, fiber-optic cable, or radio waves. An example of a logical channel is the communication occurring through defined software ports.

Order slicer 120 generates sub-orders and stores them in memory 126 and issues these suborders to a market 119. For example, FIG. 1 shows a sub-order 176 as being issued to market 119. Sub-order 176 is a separate order to buy or sell a quantity of a financial instrument that can be less than the quantity of the original order 159 of the financial instrument.

Generally, order slicer 120 accesses market database 170 to determine the projected safes for a given financial instrument as described below in greater detail. The projected sales can be based on an average of sales of the financial instrument in an earlier known time period, or other algorithms. For instance, based upon trading strategy 163, order slicer 120 calculates a first estimate of the quantity of shares to be sold at a given point in time. Then, as order slicer 120 trades sub-order 176, order slicer 120 adjusts the sub-orders in memory 126 to generally track a selected percentage of recorded market sales. However, the sub-orders in memory 126 can be recalculated by order slicer 120 when trading strategy 163 is replaced or varied. Order slicer 120 can start an execution countdown for the buy or sell orders for the individual sub-orders, on a time basis.

Trading strategy 163 can be a copy of trading strategy 184. One such example of trading strategy 163 is when the trading strategy is an aggressiveness level. For example, trading strategy 163 correlates to an aggressiveness level that is varied to a value of 40% from an aggressiveness level of I 0%. However, the parameter correlating to the overall volume of an order is defined as constant. Therefore, either a start time parameter or a stop time parameter is modified by order slicer calculator 124 to compensate for this. In other words, the time in force (the length of time between a start time and a stop time for selling an order) changes, given that the aggressiveness level is varied and that the predicted behavior of the market stays the same.

Trading strategy 163 can take on any of the equations or parameters of trading strategy 184. Order slicer calculator 124 calculates, as a function of trading strategy 163, a first unexecuted sub-order of order 159. However, upon receipt of trading strategy 131, order slicer calculator 124 calculates a second unexecuted-sub order of said order. For instance, if a first sub-order has a transaction quantity of 100, and aggressiveness level is raised from 10% to 20%, a second sub-order could be calculated that has a transaction quantity of 200.

First and second orders 159 are received by order slicer 120. Order slicer 120 associates a first trading strategy 163 with first order 159, and a second trading strategy 163 with second order 159. Both first and second orders 159 are stored in order slicer 120. Order slicer controller 120 can vary or replace second trading strategy 163 of second order 159 while both the first and second orders are stored within order slicer 120.

Market database 170 has a market trades recorder 172 and a market predictor 174. Market trades recorder 172 generates market records 175, and market predictor 174 generates market predictions 177.

Market trades recorder 172 contains data on past and present total market sales for the financial instrument. Market trades recorder 172 also records trading objective 185, trading strategy 184 and trading parameter 141.

Market predictor 174 calculates total estimated future sales for the financial instrument for a given period of time based upon market records 175. For instance, assuming that market records 175 contains data on past and present total market sales of XYZ Co., market predictor 174 calculates and averages, for example, using data from the last ten days, an estimation of the volume of shares of XYZ Co. that will be sold over a future time period. Market predictor 174 can use a second-order polynomial, such as $Ax^2+Bx+C=$"volume of shares sold" over a future time period, wherein A, B, and C are derived from statistical analysis. Therefore, a graph of a prediction of future market sales, based upon statistical averaging, may take the form of a hyperbola.

Market data 173 includes market records 175 and market predictions 177. Market data 173 is provided to order slicer 120, order slicer controller 130, and trader 140. Market data 173 can be viewed by trader 140 through accessing order slicer controller interface 135.

Order slicer controller 130 has an order slicer controller (OSC) calculator 189, an OSC receiver 181, and OSC transmitter 183, and a trading parameter 136. Order slicer controller 130 generates variable trading parameter 188 and trading strategy 131. Trading strategy 131 can be a copy of trading strategy 185, and is conveyed to order slicer 120. Similarly, trading parameter 141 can be copied to trading parameter 136, and from there to order slicer 120 as variable trading parameter 188.

Order slicer controller 130 also receives real time trading parameters 187. Real time trading parameters 187 parameters relate to information concerning trading strategy 163 or the sub-lots in memory 126. This information is forwarded over a bus 137 to order slicer controller interface 135.

Within trading strategy 163, it is possible to set a quantity threshold for ignoring large trade sizes. In other words, trades above a certain quantity will not be taken into consideration when calculating sub-orders. By excluding this spike of quantity from order slicer 120 calculations, order slicer 120 would have less impact on the market. For instance, if a very large trade is to take place, (for example, the large size trade is approximately equal to the volume of overall trades that typically take place for a given financial instrument over a time period), and trading strategy 163 is programmed with an aggressiveness level, a large size trade could induce order slicer 120 to try to sell sub-orders that would also be high-quantity sub-orders. This could adversely affect the market. Use of the quantity threshold helps to alleviate this problem.

OSC calculator 189 varies or replaces trading strategy 131 as a function of a variation or replacement of trading objective 185. Order slicer controller 130 can also vary variable trading parameter 136 to compensate for varying or replacing trading objective 185 or trading strategy 184. Trading parameter 136 is output as variable trading parameter 188. Alternatively, order slicer controller 130 varies or replaces trading strategy 131 for submittance to order slicer 120.

Trading parameter 133 and the calculated trading strategy is then transmitted to order slicer controller interface 135 over a bus 137.

OSC calculator 189 calculates, for a time interval, a predicted ratio of trading quantity an unexecuted sub-order represents of a total predicted trading volume for the financial instrument. For example, if for a time interval, an unexecuted sub-order trade has a predicted trading quantity of 200 shares, and during the same time interval, the financial instrument is predicted to sell 1000 shares, a predicted ratio of trading quantity for the unexecuted sub-lot is 20% of the overall trading volume for the financial instrument. Trading parameter 133 and the calculated trading strategy is then transmitted to order slicer controller interface 135 over bus 137.

OSC calculator 189 calculates, for a time interval, a realized ratio, such as a percentage, of trading quantity an executed sub-order represents of a total executed trading volume for the financial instrument. For example, if for a time interval, a sub-order has a trading quantity of 100 shares, and during the time interval, the financial instrument sold 1000 shares, the realized ratio of trading quantity for the sub-lot is 10%.

OSC calculator 189 calculates, as a function of real-time trading parameters 187, a predicted ratio of trading quantity the second unexecuted sub-order represents of the total predicted amount of volume for the financial instrument over the time interval.

Within OSC calculator 189, trading strategy 131 can be derived from trading objective 185. For instance, if trading objective 185 is "(a)" of minimizing the impact of an order on market 119, then trading strategy 131 could be that of "(a)" breaking the order into smaller quantity sub-orders, and minimizing time intervals between consecutive sub-order trades. However, if trading objective 185 is "(b)", attempting to get the most favorable results in terms of immediate cash, then trading strategy 131 could include a change of venue for an order.

OSC calculator 189 generates an expected rate curve based on market data. Expected rate curve is a mathematical expression that is generally based on a previous trading volume for a same or similar stock over a similar period, and is the expected rate of trading for a particular financial instrument. In one embodiment, an expected rate calculation for expected rate curve 310 is based on the previous day's trading volume, and uses a $2^{nd}$ order polynomial approximation. One reason for using a polynomial, such as a $2^{nd}$ order polynomial, is that this generates a parabola, and it has been generally found that volume of sales for an financial instrument tends to be parabolic over a given day. Therefore, the previous day's trading amounts are smoothed using this parabolic. Expected rate curve 310 can be updated and modified with market data 173. However, other predictive approximations than a parabola can be used, and other time periods from which to average can also be used.

OSC calculator 189 calculates an average target-trading rate that should be achieved by order slicer 120 to fill order 159 for a given time period. Order slicer 120 then seeks to have sub-order 175 quantity correspond to this rate. Target trading rate can be a hyperbola, and so on, depending upon received variable trading strategy 184.

It is possible that, as the relationship between trade volume and the quantity of the executed sub-orders did not follow target trading curve. In other words, market 119 did not behave as predicted. Therefore, a slicing of order 159 would not be completed at a set level of aggressiveness as set by trading strategy 163. OSC calculator 189 then would itself vary trading strategy 163 so to meet actual market transactions. Alternatively, trading strategy 163 could set by OSC calculator 189 to be a fixed level of trading aggressiveness, irrespective of market behavior, thereby allowing the order to finish early or not to finish at all.

Order slicer controller interface has a variety of techniques for selecting among differing trading objectives 185, trading strategies 184, or trading parameter 141. These can include pull down menus or keypad entries, as will be described later in more detail.

Order slicer controller interface 135 displays a predicted ratio trading quantity associated with first unexecuted suborder and second unexecuted suborder. In other words, this is the percentage a quantity of an unexecuted sub-order represents of a predicted volume for a financial instrument.

Order slicer controller interface 135 receives input from order slicer controller 130 over bus 137 regarding other characteristics pertaining to the remaining sub-orders for each order that are being processed by order slicer 120. This information can be expressed as real time trading parameter 187. This information can include the size and type of each future sub-order sale for a given order, the time in force for order 159, and so on, which is then displayed on order slicer controller interface 135

Order slicer controller interface 135 includes an input device, such as a keyboard or speech recognition subsystem. Order slicer controller interface 135 also includes an output device such as a display or a printer. A cursor control such as a mouse, track-ball, or joy stick, allows the user to manipulate a cursor on the display for communicating additional information and command selections to order slicer controller interface 135.

Trader 140 can provide a single indicia to generate, replace or vary trading objective 185 or trading strategy 184 through order slicer controller interface 135. This single indicia could be, for instance, a mouse click, a sound, a keyboard entry, a push-button entry, and a touch-screen entry. When trader 140 provides the single indicia, generating trading objective 185 or trading strategy 184, this can save significant time for trader 140. Trader 140 can also input trading parameter 14I with a minimum of input.

One advantage of the system 100 is that buy/sell orders can be updated in order slicer 120 without the cancellation of any unexecuted portion of order 159 and the issuance of a new order 159 by OMS 110. That is, it is not necessary to issue a "cancel" order or a "cancel/replace" order, typically a time and resource intensive process.

Figure 2:
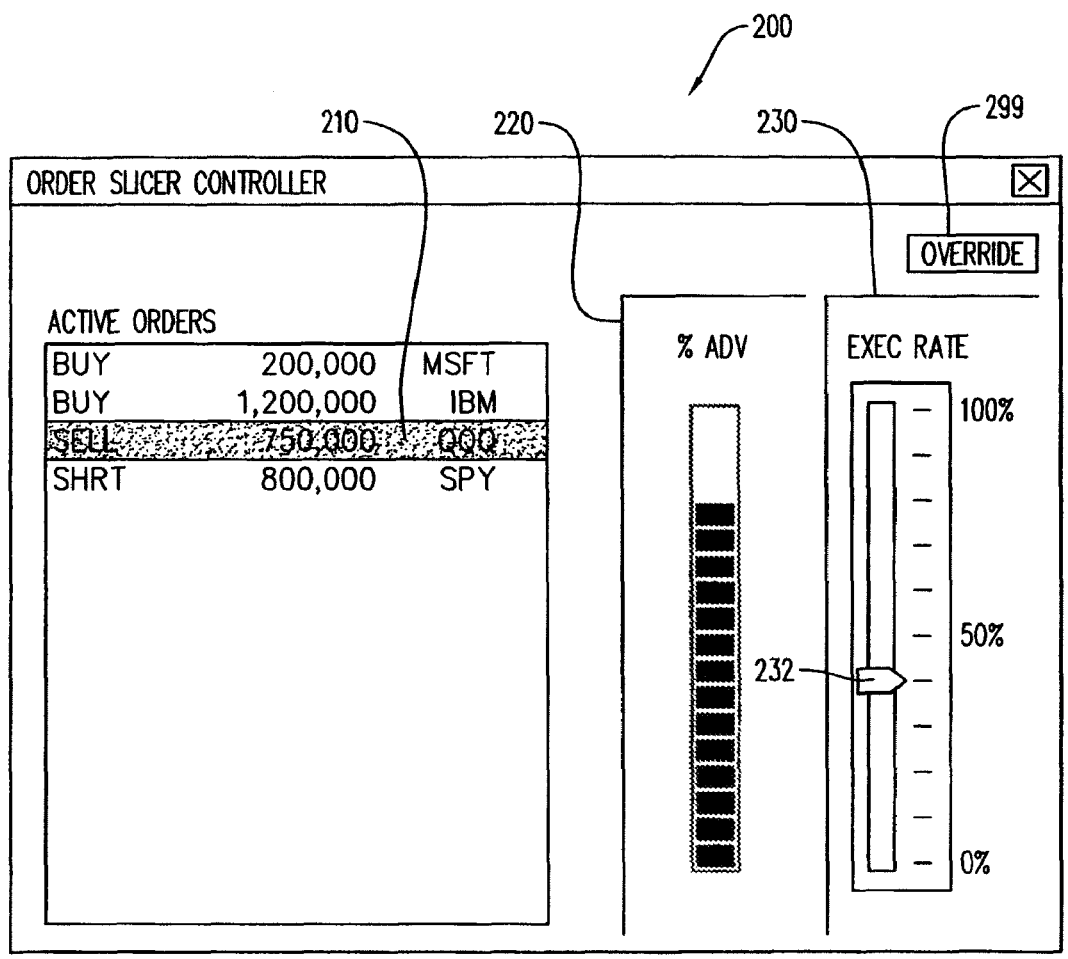
FIG. 2 illustrates a display of an interface for the system of FIG. 1.

Referring to FIG. 2, illustrated is one embodiment of an interface 200 of order slicer controller interface 135. Interface 200 includes an active order screen 210, an average daily volume (ADV) window 220, an execution rate (exec window) 230, and an override button 299.

Active order screen 210 lists information concerning order 159, as well as other orders 159. One piece of information, whether order 159 is a "buy" or "sell," is also output in active orders screen 210. Active orders screen 210 shows the numbers of shares to be traded for each order 159. Finally, active orders screen 210 shows the name of the financial instrument for each order 159.

FIG. 2 shows an interface 200 for a particular financial instrument transaction, an instance of order 159, selected by trader 140, as is illustrated by a shaded area of active order screen 210, and further information concerning this order is displayed in average daily volume (ADV) window 220 and exec rate window 230.

ADV window 220 displays results of calculations as to what percentage of sales for a particular financial instrument, over a defined time interval, and an executed or unexecuted sub-order transaction represents when compared to all of the projected or actual financial instrument transactions for a time period.

Exec rate window 230 preferably has a sliding bar 232. Sliding bar 232 is set by trader 140 to select and for vary a trading strategy 184. The slider within exec rate window 230 can be varied by trader 140, and made higher or lower. If this occurs, at least one of the start time parameter, stop time parameter, either of which correspond to trading parameter 141, or aggressiveness level, which, in the illustrated corresponds to trading strategy 184, can vary. Trader 140 fixes an aggressiveness level through use of exec rate window 230, and varies stop time parameter of initial trading parameters 145. Trader 140 sets or varies trading strategy 184 through setting or moving sliding bar 232 in execution rate window 230.

Alternatively, order slicer 120 can be ordered, through employment an override button 299, to ensure that a given transaction of a financial instrument is completed during TIF, no matter what executed market volume turns out to be. Override button 299 is an example of trading objective 185 of type "c".

Figure 3:
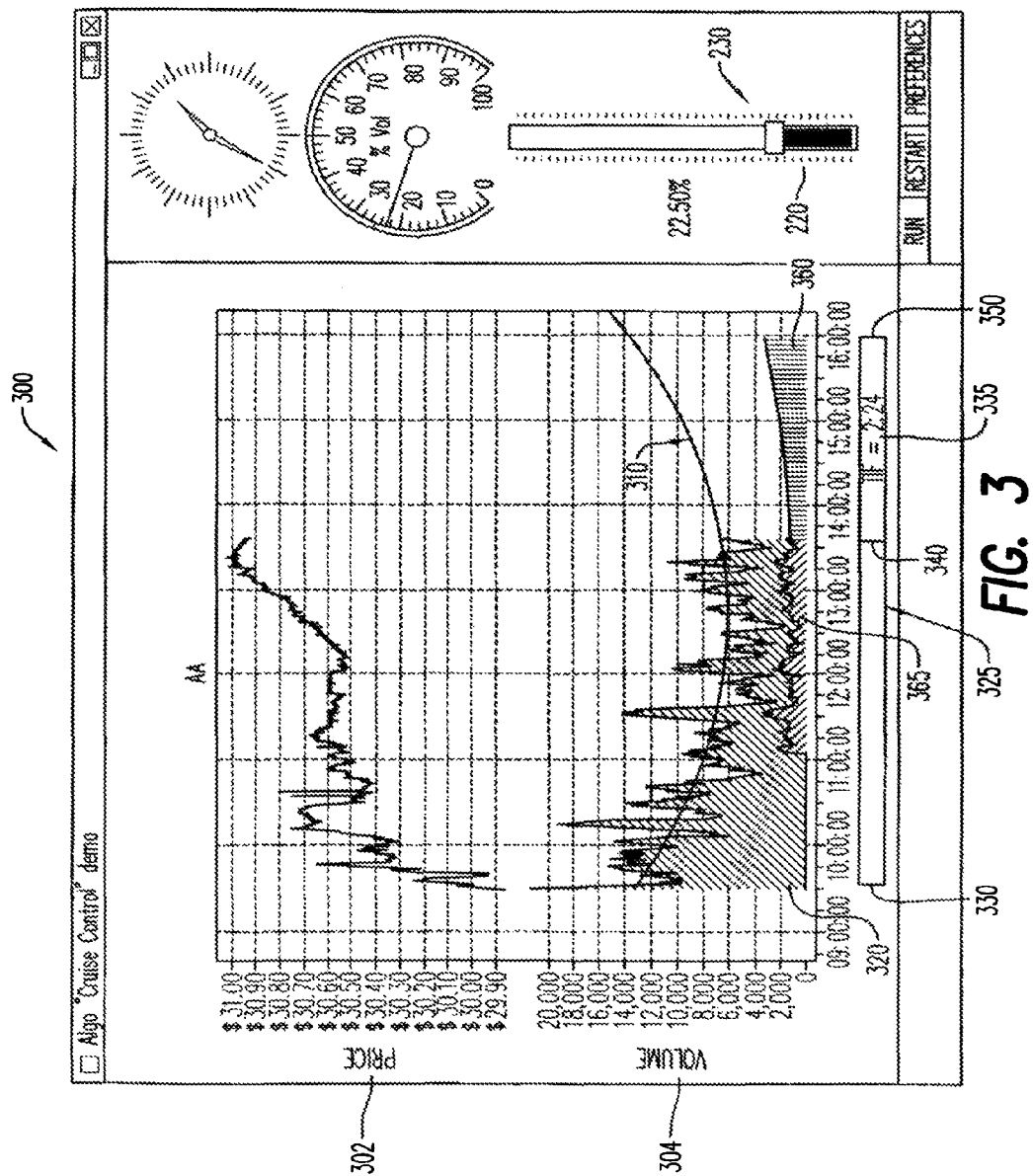
FIG. 3 illustrates a graph of data for use with updating an order slicer.

Referring to FIG. 3, there is illustrated is one embodiment of a visual interface 300 employable on order slicer controller interface 135. Visual interface 300 has a price display 302 and a volume display 304. Price display 302 shows a price for a given financial instrument at different times of the day. Volume display 304 generally shows a variety of information related to a rate of trading for a financial instrument, such as trading volume per minute, both predicted and actual, during the trading day.

Expected rate curve 310 represents an approximation of an expected trading rate for a given financial instrument over a time period. Expected rate curve 310 is illustrated as a non-linear function.

A conventional trade volume graph (not illustrated) would represent the volume and frequency of overall trades, but not the volume of trades over time. Trade volume graph 320 takes a conventional trade volume graph and integrates it on a "trades-per-minute" level, although those of skill in the art understand that other time periods are also employable. Trade volume graph 320 integrates over a moving time window, thereby making it easier for trader 140 to see overall market performance. From this point, it is easier for trader 140 to first determine and then set an aggressiveness level. In a given trading day, as the trades actually occur, the volume of trades for a given financial instrument is illustrated in a trade volume graph 320. In the illustrated example of FIG. 3, the volume of trades is in units of shares, but the trade volume graph 320 can be set for other trading measurements.

Visual interface 300 also shows an executed sub-order sales 365. This represents the trade quantity that sub-orders executed by order slicer 120 represent from a point in the past until the present. As is illustrated, there is some relationship between trade volume graph 320 and executed sub-order sales 365. Generally, executed sub-order sales 365 should be illustrated as percentage of trade volume graph 320. A target trading curve 360 is also illustrated.

In FIG. 3, target trading curve 360 is illustrated as a fixed percentage of expected rate curve 310. As explained above, this is the target quantity calculated as a result of trading strategy 163. However, target trading curve 360 can itself be a non-linear function of expected rate curve 310.

Visual interface 300 also includes a timing bar 325. A left edge 330 of timing bar 325 can indicate when a financial instrument order from OMS 110 was entered into order slicer 120. Alternatively, left edge 330 can indicate the beginning of graphing information for a particular financial instrument.

Timing bar 325 has within it also a time in force (TIF) bar 335_ A left side 340 of TIF bar 335 sets the time the order is to become active, and therefore individual sub-orders will be sold by order slicer 120. A right side 350 of TIF bar 335 represents when the order is targeted to be finished. Trader 140 can make a manual adjustment of left side 340 and right side 350 to vary the start time parameter and stop time parameter, respectively, used by order slicer 120.

Exec rate window 230 and TIF bar 335 display some of the same information, and setting a change in either will show up as a change in the other. For instance, a change in execution rate as expressed in exec rate window 230 can change right side 340 and left side 350 of TIF bar 335 to compensate for the change. This is because, as aggressiveness level has been changed by changing slider 232, and because the overall quantity of order 159 stays the same, it should take less time to execute the trade for order 159.

A change in execution rate of exec rate window 230 changes target trading curve 360. Through changing execution rate, the aggressiveness level is changed so, therefore, target percentage trading curve 360 also changes.

A variation of parameters expressed within TIF bar 335, changes the visible representation within exec rate window 230 for order 159. This is because as the order 159 quantity stays the same, but the TIF alters. Thus, the exec rate of window 230 changes to compensate. As the exec rate of exec rate window 230 is changed, average daily volume 220 (or other time average) would start to show an increase, as trade volume graph 320 changes to target a heightened or lowered percentage of target percentage trading curve 360.

Figure 4:
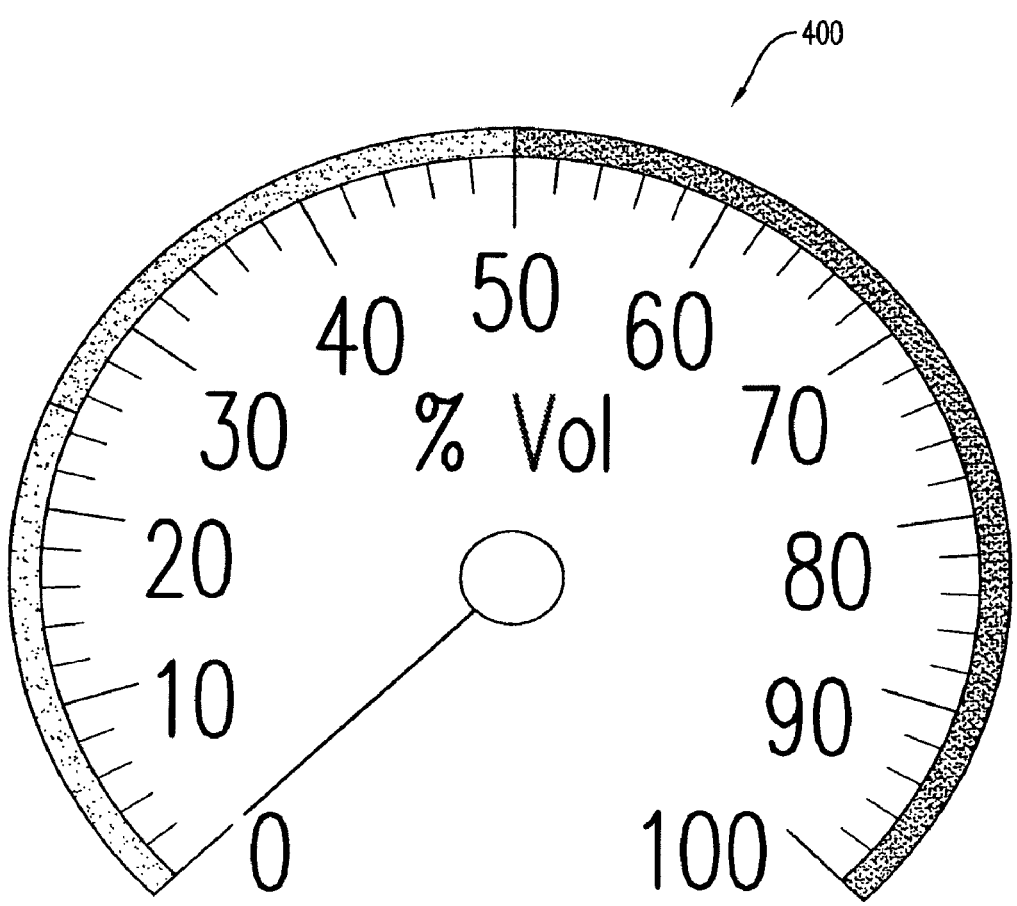
FIG. 4 illustrates a visual indicator for illustrating the percentage of sales quantity a sub-order represents of the total sales volume for a financial instrument.

Referring to FIG. 4, there is illustrated is a visual indicator 400 than can be generated in order slicer controller interface 135. Visual indicator 400, which could also be a bar graph or other visual indicator, shows the real rate of how large a percentage of the actual traded quantity an order or sub-order of trader 140 is taking over any given time of the total volume of sales for a financial instrument. Trader 140 can monitor visual indicator 400 to ensure that the actual percentage of sales that sub-order 175 represent is tracking an acceptable percentage.

For instance, a sale of sub-order 175 of order 159, representing 25% of total sales of a financial instrument in a given time could be acceptable, but suborder 175 representing 50% of total sales for a given financial instrument might not be. Visual indicator 400 gives trader 140 information in a format that aids trader 140 in resetting trading objective 185, trading parameter 141 or trading strategy 184.

Figure 5:
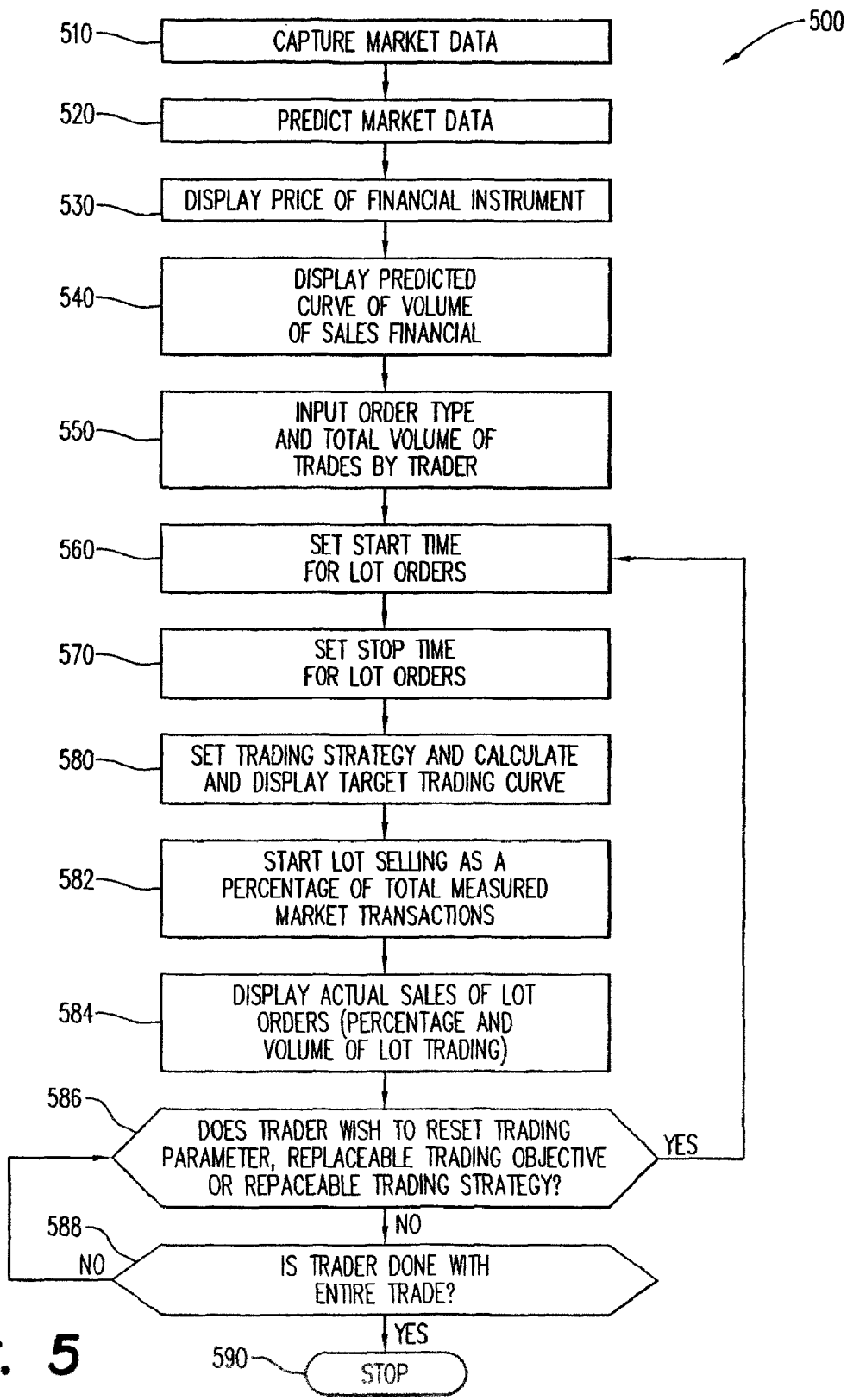
FIG. 5 illustrates a method for varying a trading parameter and replacing or updating a trading objective and a trading strategy in an order slicer controller.

FIG. 5 illustrates a method 500 for use with system 100. In step 510, market records 175 are forwarded to trader 140. The method then advances to step 520.

In step 520, market predictions 177 for a selected financial instrument are calculated in market predictor 174. The method then advances to step 530.

In step 530, prices for the selected financial instrument are displayed as price display 302. Although illustrated as a single step for ease of illustration, step 530 can be reiterated as the trading day progresses. The method then advances to step 540.

In step 540, expected rate curve 310 is generated. This prediction can be performed with a hyperbola or other higher order function that models predicted behavior of sales activity of a financial instrument. The method then advances to step 550.

In step 550, the order type (that is, is it a "buy or sell" order), the stock identifier, the quantity of the stock, and so on, is input into OMS 110.

In step 560, trader 140 sets the start time parameter for order 159 initially through OMS 110, in. However, varying the start time parameter is performed by trader 140 through TIF bar 335 or another window or input of order slicer controller interface 135. The method then advances to step 570.

In step 570, trader 140 sets start stop time parameter for order 159 initially through OMS 110. However, varying the stop time parameter is performed by trader 140 through TIF bar 335 or another window or input of order slicer controller interface 135. The method then advances to step 580.

In step 580, order slicer controller 130 calculates and order slicer controller interface 135 displays target trading curve 360. Also, trading strategy 131 is calculated, or alternatively, order slicer controller 130 has trading strategy 184 input into it directly by trader 140. In any event, trading strategy 131 is conveyed to order slicer 120 to use as trading strategy 163 when using calculations using market data 173. Order slicer controller 130 also calculates predicted volume of sales a given financial instrument should have, based upon expected rate curve 310, and illustrates this as target trading curve 360.

In step 582, order slicer 120 starts sub-order selling as function of total measured market transactions, as reported by market sales recorder 172, and replaceable trading strategy 184. The method then advances to step 584.

In step 584, order slicer controller interface 135 displays actual sales of the trader 140 as executed sub-order sales 365. These can be compared to the overall volume sales of the financial instrument as illustrated in trade volume graph 320. The method then advances to step 586.

In step 586, trader 140 can decide to vary or replace trading strategy 184, replaceable trading objective 185, or vary trading parameter 141. If trader 140 wishes, then method 500 loops back to step 560. If trader 140 does not so wish, then method 500 advances to step 588.

In step 588, method 500 determines whether trader 140 is finished with the entire trade. If trader 140 is not finished, then method 500 loops back to step 586. However, if trader 140 is finished, method 500 stops in step 590.

Figure 6:
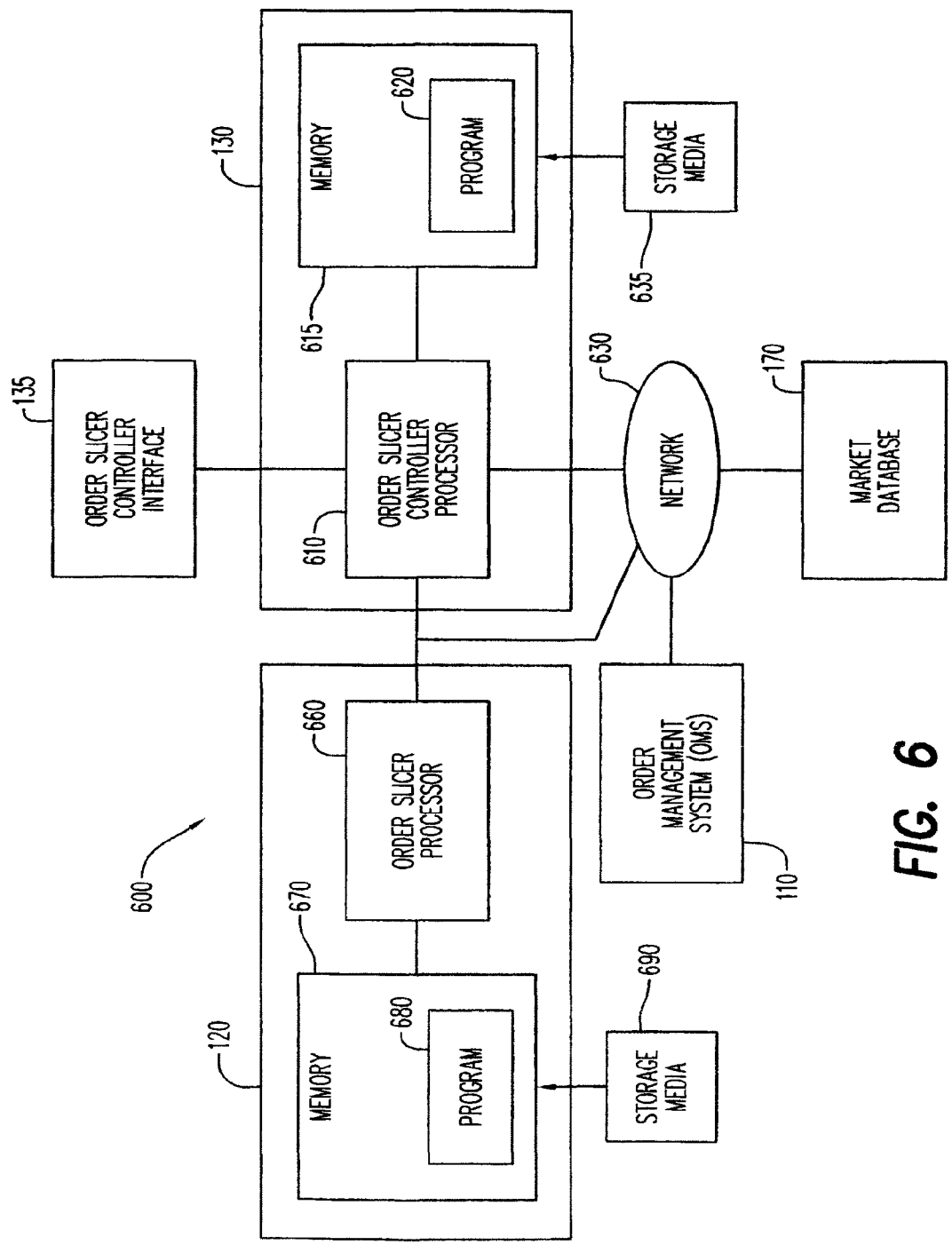
FIG. 6 is a flow chart of a computer system for use with an order slicer and order slicer controller.

FIG. 6, illustrates a block diagram of a computer system 600 adapted for employment of order slicer 120 and order slicer controller 130. Computer system 600 includes order slicer 120. order slicer controller 130, order slicer controller interface 135, database 170, OMS 110, and a network 630. Order slicer 120 is coupled to order slicer controller 130. Network 630 is coupled to order slicer 120 and order slicer controller 130. OMS 110 is coupled in circuit to order slicer controller 130. Market database 170 is also coupled to network 630.

Order slicer 120 includes an order slicer processor 660 and memory 670. Memory 670 can be configured with any of a random access memory (RAM), a hard drive and a read only memory (ROM). Memory 670 includes a program 680.

Program 680 includes instructions for controlling order slicer processor 660 to execute the operations of order slicer 120 described above in association with FIGS. 1 to 5. For instance, as a result of execution of program 680, order slicer processor 660 determines the quantity for the individual sub-order sizes and stores this memory 670. Sub-orders are then sent to market 119. Program 680 may be implemented as a single module or as a plurality of modules that operate in cooperation with one another.

While program 680 is indicated as already loaded into order slicer memory 675, it may be configured on a storage media 690 for subsequent loading into memory 670. Storage media 690 can be any conventional storage media such as a magnetic tape, an optical storage media, a compact disk, or a floppy disk. Alternatively, storage media 690 can be a random access memory, or other type of electronic storage, located on a remote storage system.

Order slicer controller 130 includes an order slicer controller processor 610, a memory 615, and a program 620. Memory 615 can be configured with any of random access memory (RAM), a hard drive and a read only memory (ROM). Memory 615 includes a program 620.

Program 620 includes instructions for controlling order slicer controller processor 610 to execute the operations of order slicer controller 130 described above in association with FIG. 1-5. For instance, as a result of execution of program 620, order slicer controller processor 610 determines expected rate curve 310 and stores this within order slicer controller memory 615. Program 620 may be implemented as a single module or as a plurality of modules that operate in cooperation with one another.

While program 620 is indicated as already loaded into order slicer controller memory 615, it may be configured on a storage media 635 for subsequent loading into memory 615. Storage media 635 can be any conventional storage media such as a magnetic tape, an optical storage media, a compact disk, or a floppy disk. Alternatively, storage media 635 can be a random access memory, or other type of electronic storage, located on a remote storage system.

Order slicer controller 135 can present, among other interfaces, interface 200, visual interface 300, and visual indicator 400 on the display, and provides a hardcopy of such displays via the printer.

Computer system 600 may be implemented on a general purpose microcomputer, such as one of the members of the Sun™ Microsystems family of computer systems, one of the members of the IBM™ Personal Computer family, or any conventional work-station or graphics computer device. Although computer system 600 is represented herein as a standalone system, it is not limited to such, but instead can be coupled to other computer systems (not shown) or other order slicers 120 or other order slicer controllers 130 via a network 630. Order slicer 120 can be controlled by a plurality of order slicer controllers 130, and order slicer controller 130 can control or program a plurality of order slicers 120.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A securities transaction method comprising:
    capturing real-time market data of a financial instrument to calculate an expected trading rate approximation;
    displaying to a trader a price and said expected trading rate approximation of said financial instrument;
    accepting from said trader a trading order type, order volume, order start time and order stop time for said financial instrument;
    displaying an interface for said trader to indicate a change of replaceable trading strategy by use of a single indicia and receiving said single indicia to change said replaceable trading strategy;
    calculating, by an order slicer processor, a target trading rate based on a fixed percentage of said expected trading rate approximation and said replaceable trading strategy provided by said trader as a single indicia;
    displaying to said trader said target trading rate;
    slicing and selling a portion of a total volume of trades for said financial instrument based on said target trading rate; and
    displaying to said trader one or more results of said sales of said financial instrument.

2. The securities transaction method of claim 1, further comprising:
    providing to said trader one or more opportunities to modify one or more trading parameters prior to completion of selling said financial instrument.

3. The securities transaction method of claim 2, further comprising:
    recalculating said target trading rate based on said sales of said portions, said real-time market data and said single indicia.

* * * * *